United States Patent [19]

Gnauck et al.

[11] Patent Number: 5,959,658
[45] Date of Patent: Sep. 28, 1999

[54] NETWORK APPARATUS AND METHOD TO PROVIDE COMPRESSED DIGITAL VIDEO OVER MINI-FIBER NODES

[75] Inventors: Alan H. Gnauck, Middletown; Xiaolin Lu, Matawan; Kenneth C. Reichmann, Hamilton Square; Sheryl Leigh Woodward, Holmdel, all of N.J.

[73] Assignee: AT&T Corp, New York, N.Y.

[21] Appl. No.: 08/747,708

[22] Filed: Nov. 12, 1996

[51] Int. Cl.$^6$ .................................................. H04N 7/10
[52] U.S. Cl. ................................................. 348/6; 455/3.1
[58] Field of Search ................................... 348/6, 10, 12; 455/3.1, 4.2, 5.1, 6.1; H04N 7/10

[56] References Cited

U.S. PATENT DOCUMENTS

| | | | |
|---|---|---|---|
| 5,020,049 | 5/1991 | Bodeep et al. | 370/3 |
| 5,111,475 | 5/1992 | Ackerman et al. | 372/96 |
| 5,345,504 | 9/1994 | West, Jr. | 455/3.1 |
| 5,528,582 | 6/1996 | Bodeep et al. | 370/24 |
| 5,592,477 | 1/1997 | Farris et al. | 370/396 |
| 5,606,725 | 2/1997 | Hart | 455/5.1 |
| 5,638,426 | 6/1997 | Lewis | 348/8 |

OTHER PUBLICATIONS

"Designing the Return System for Full Digital Services", Dean A. Stoneback and William F. Beck, Society of Cable Telecommunications Engineers, 1996 Conference on Emerging Technologies, Jan. 8–10, 1996, San Francisco, Ca., pp. 269–277.

"Mini–fiber–node hybrid fiber coax networks for two–way broadband access", X. Lu et al., OFC '96 Technical Digest, pp. 143–144.

Broadcast digital video as a low–cost overlay to baseband digital–switched services on a PON, K. C. Reichmann et al., OFC '96 Technical Digest, pp. 144–145.

"On Determining the Optimum Modulation Index for Reverse Path Lasers in Hybrid Fiber/Coax Networks", Lamar E. West, IEEE Photonics Technology Letters, vol. 8, No. 41, Nov. 1966, pp. 1555–1557.

"Clipping–Induced Impulse Noise and Its Effect on Bit–Error Performance in AM–VSB/64QAM Hybrid Lightwave Systems", X. Lu et al., IEEE Photonics Technology Letters, vol. 6, No. 7, Jul. 1994, pp. 866–868.

Primary Examiner—Victor R. Kostak

[57] ABSTRACT

A communication network and method is provided to communicate between a central office/head end and a plurality of end-units (EUs). A first transmission medium is connected between the central office and an intermediate node. A plurality of second transmission mediums are connected between the central office and a plurality of mini-fiber nodes. The intermediate node is also associated with each of the mini-fiber nodes such that an analog broadcast service may be sent over the first transmission medium to each of the mini-fiber nodes. Further, switched digital services and digital broadcast services are also sent over the second transmission mediums to each of the mini-fiber nodes. The mini-fiber nodes combine the signals and send the combined signals to a corresponding subset of EUs.

33 Claims, 7 Drawing Sheets

NETWORK APPARATUS AND METHOD TO PROVIDE COMPRESSED DIGITAL VIDEO OVER MINI-FIBER NODES

BACKGROUND OF THE INVENTION

1. Field of the Invention

This invention relates to providing video services to hybrid fiber optic/coaxial cable (HFC) networks and, more particularly, to providing multi-channel compressed digital video to mini-fiber node (mFN) HFC networks.

2. Background of Related Art

Conventional CATV systems provide downstream broadcast information from a central office (CO) to end-units (EUs) for multiple CATV channels (AM-VSB) using analog broadcast signals from 55 MHz to 350 MHz, 550 MHz or even 750 MHz. Cable operators have incentives to increase the channel capacity of their coaxial cable systems to thereby provide additional services such as premium and pay-per view channels, which increase revenue. However, upgrading conventional coaxial cable or hybrid fiber optic/ cable (HFC) systems to 750 MHz (or from 350 MHz to 550 MHz) requires re-engineering the entire cable plant including at least amplifier replacement (upgrade) and associated amplifier spacing. Further, many conventional system operators also want to provide broadcast digital signals, as well as broadcast analog signals over a single transmission line. However, this is difficult, as impulse noise caused by the analog signals can cause errors in the digital signals. See, for example, Lu et al., *Clipping Induced Impulse Noise and Its Effects on Bit-Error Performance in AM-VSB/QAM Hybrid Lightwave Systems*, PTL July 94, pp. 866–868, which is herein incorporated by reference. The expense of such cable plant upgrades explains why the majority of all CATV plants in the U.S. have not been conventionally upgraded to 750 MHz.

U.S. patent application Ser. No. 08/526,736 filed Sep. 12, 1995, the subject matter of which is incorporated herein by reference, provides an alternative mFN upgrade to an HFC network. The pre-existing HFC network provides a first access path from the CO to the EUs. In the resulting mFN-HFC networks, the mFNs receive signals from a central office (CO) through a second access path separate from the preexisting HFC network for transmission to EUs. Further, the mFNs can receive upstream signals from the EUs for transmission back to the CO over the second access path. In addition, conventional wisdom, as exemplified by Stoneback et al., *Designing the Return System for Full Digital Services*, Society of Telecommunications Engineers, Jan. 10, 1996, pages 269–277, the subject matter of which is incorporated herein by reference, suggests a constant power/ Hz as the preferred allocation of power/Hz when many different signal types including various modulation schemes of differing bandwidth are carried. However, problems including mFN-HFC network inefficiencies result by not allocating power/Hz based on the services provided by each signal type and the performance requirements of each provided service.

Thus, an efficient, cost-effective apparatus and method is needed to upgrade existing CATV systems to provide compressed digital video (CDV) for broadcast television channels and improve power allocation over a mFN-HFC network.

SUMMARY OF THE INVENTION

A communications network is provided that includes a central office and a plurality of first transmission mediums, for connecting the central office with at least one of a plurality of end-units. The central office transmits a first broadcast signal along each of the plurality of first transmission mediums and an allocated signal along one of the plurality of first transmission mediums to be received by at least one specified end-unit.

Another communications network is provided that includes a first transmission medium and a plurality of second transmission mediums, which are separate from the first transmission medium, connected to a central office. The network further includes a plurality of intermediate nodes and a plurality of passive transmission mediums. The central office transmits a first broadcast service over the first transmission medium and a second broadcast service over the plurality of second transmission mediums. Each one of the plurality of intermediate nodes connects to a separate one of the plurality of second transmission mediums and connects to the first transmission medium to combine the first broadcast service and the second broadcast service. Each of the plurality of passive transmission mediums connects to one of the intermediate nodes for carrying the combined services to be received by a corresponding subset of a plurality of end-units.

Still another communications network is provided that includes a central office, a transmission medium for connecting the central office to a plurality of end-units and a power control device. The central office transmits a plurality of digital services along the transmission medium and the power control device controls digital service signals on analog subcarriers transmitted on the transmission medium based on a power per channel determined by bit-error-rate performance requirements of the digital services provided.

A HFC bi-directional communication system (network) is provided using mini-fiber nodes (mFNs) and central office interface units to broadcast signals over the mFN access path. By using the same video format as direct broadcast satellite (DBS) signals the mFN-HFC network employs a developed technology. Obviously, other formats could be used. In addition, this implementation results in cost-effective connectivity that provides the compressed digital video (CDV) signals and broadcast video services in mFN-HFC systems.

Further, by allocating the power/Hz of the transmitted signal based on the required bit-error-rate at the end-unit, the mFN-HFC network can transmit digital broadcast television services (i.e., CDV) as well as switched services. The required bit-error-rate (BER) at the end-unit may be determined at least by the service provided, the modulation format and the error correction technique, if any.

In addition, the mFN-HFC network can be implemented as an upgrade to conventional HFC networks which surpasses the current state-of-the art CATV systems by simultaneously providing bi-directional capabilities and additional multichannel broadcast digital video without re-engineering existing cable plants or disrupting existing services.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
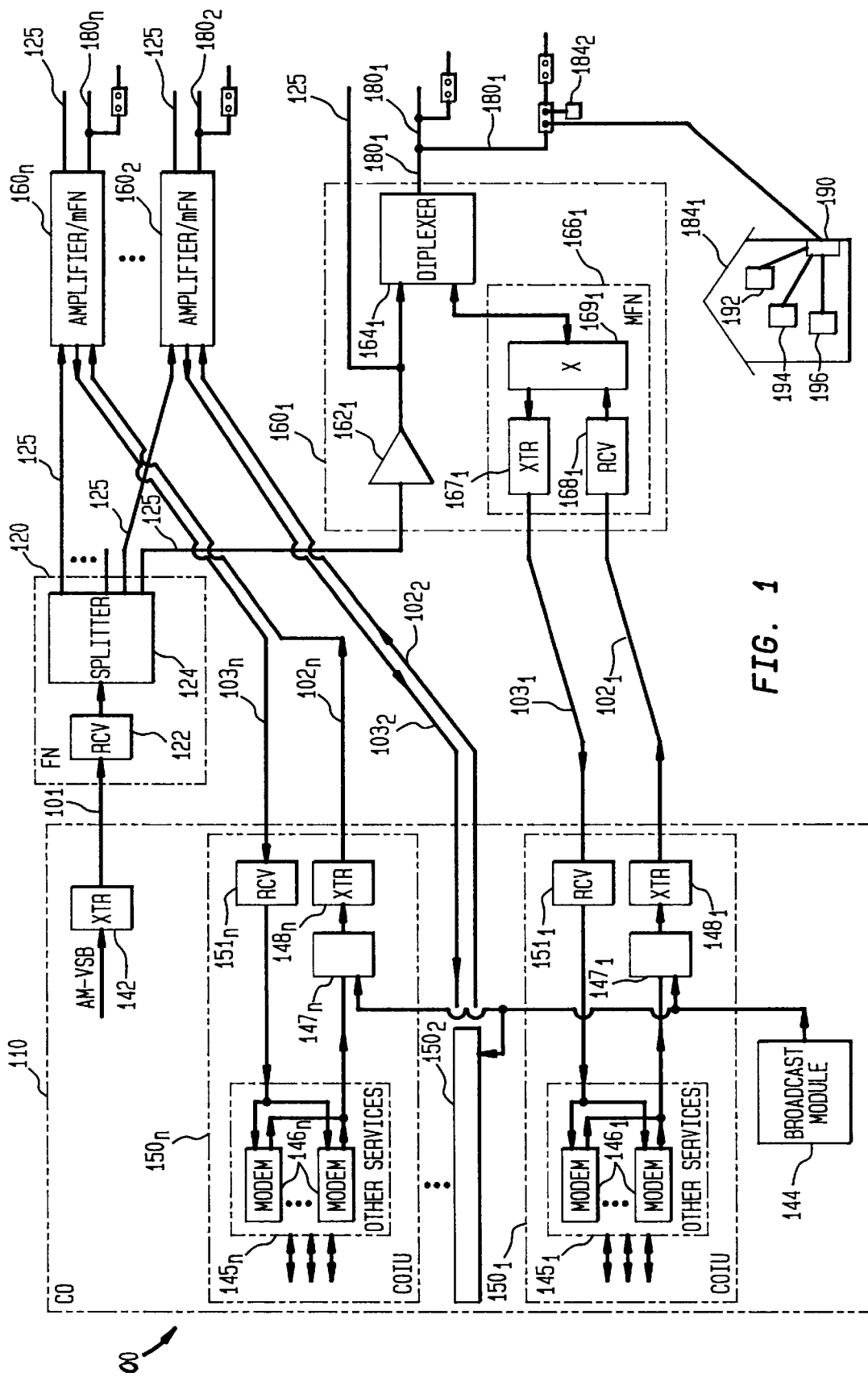
FIG. 1 is a diagram showing an HFC network using mFNs to transmit CDV signals according to a preferred embodiment of the present invention.

As shown in FIG. 1, hybrid fiber/coax (HFC) bi-directional communication network 100 will be described using mini-fiber nodes (mFNs) to transmit compressed digital video (CDV) signals according to an embodiment of the present invention. First, the basic mFN-HFC architecture will be described, then additions to provide broadcast signals will be presented. Finally we will present apparatus and methods for improving the capacity of the optical links.

Figure 7:
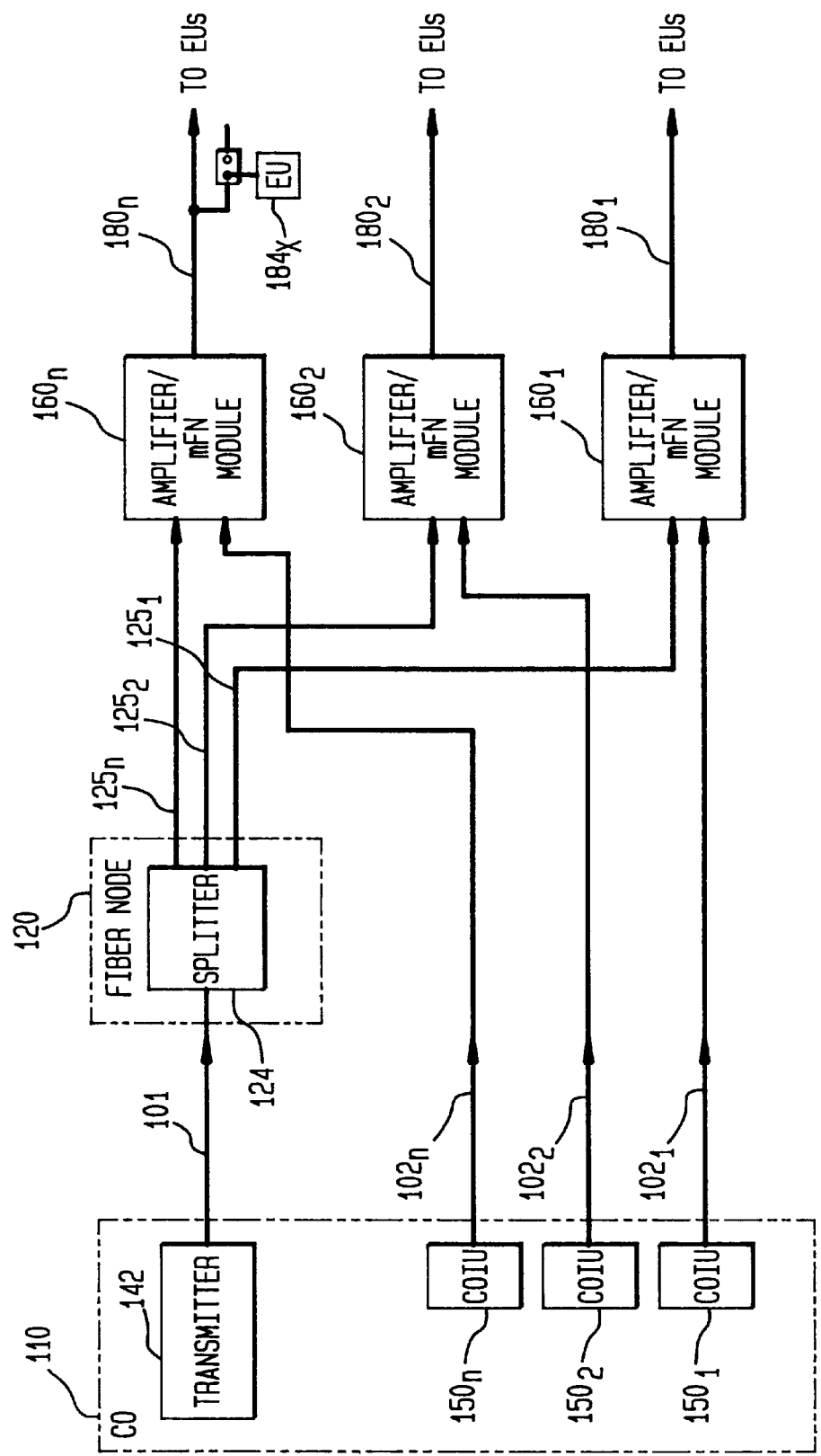
FIG. 7 is a generic description of FIG. 1.

FIG. 7 shows a generic schematic of the FIG. 1 embodiment. A transmitter 142 transmits an analog broadcast signal over optical fiber 101 to fiber node (FN) 120. From FN 120, a plurality of coax cables 125 connect splitter 124 to respective amplifier/mFN modules $160_1$–$160_n$. For simplicity, only one amplifier/mFN module $160_1$–$160_n$ is shown connected to each coax cable, but it is understood that multiple amplifier/mFN modules $160_1$–$160_n$ can be connected to each of the coax cables 125. Further, CO 110 outputs digital broadcast video signals from each central office interface unit (COIU) $150_1$, $150_2$ and $150_n$ along optical fibers $102_1$, $102_2$ and $102_n$, respectively. Each COIU $150_1$–$150_n$ may be connected to a single or multiple amplifier/mFN modules $160_1$–$160_n$.

Each of the COIUs $150_1$–$150_n$ may be appropriately designed to also transmit digital switched service signals along each of the optical fibers $102_1$–$102_n$. The optical fibers are further connected to amplifier/mFN modules $160_1$–$160_n$. Accordingly, the amplifier/mFN modules $160_1$–$160_n$ each receive the analog broadcast signal that was transmitted along fiber 101 and also receive the digital broadcast signal sent over fibers $102_1$–$102_n$. Each amplifier/mFN module $160_1$–$160_n$ is likewise connected to a respective coax cable $180_1$–$180_n$ and a corresponding subset of end-units (EUs) along each of the cables $180_1$–$180_n$. Each of the COIUs $150_1$–$150_n$ can receive return signals, which are not shown in FIG. 7, transmitted upstream from the EUs to the CO 110.

When a specific one of the EUs 184, for example $184_x$, along cable $180_n$ desires a switched (or allocated) service, then the COIU $150_n$ outputs the respective switched service signal along fiber $102_n$ to amplifier/mFN module $160_n$ and finally to cable $180_n$. The specific EU $184_x$ then receives the switched service, preferably in an encrypted format.

In summary, the present invention allows EUs, for example a specific EU $184_x$ to receive analog broadcast signals from transmitter 142 and digital signals including broadcast signals and switched service signals from one of the COIUs $150_1$–$150_n$. These signals are appropriately combined in the respective amplifier/mFN module and transmitted over the respective cable to the physically and logically connected subset of end-units. Further, only a specific end-unit requesting the switched service is able to receive and properly decode the switched service signal.

As shown in FIG. 1, central office (CO) 110 connects via optical fiber 101 to a remote signal distribution unit, referred to hereinafter as FN 120. Alternatively, the optical fiber 101 can be a coaxial cable. CO 110 transmits analog broadcast information, such as multiple CATV channels (AM–VSB) using high quality laser transmitter 142 and optical fiber 101. In mFN-HFC network 100, AM–VSB signals are broadcast by transmitter 142 to a plurality of approximately a thousand EUs $184_1$–$184_{1000}$ (not shown) (hereafter the EUs connected to CO 110 will be referred to as EUs 184). The broadcast information is transmitted by the transmitter 142 as analog information on analog subcarriers.

At FN 120, optical signals with the broadcast information are received and converted to electrical signals by a receiver 122. FN 120 serves a plurality of coaxial cables 125 through splitter 124.

Figure 2:
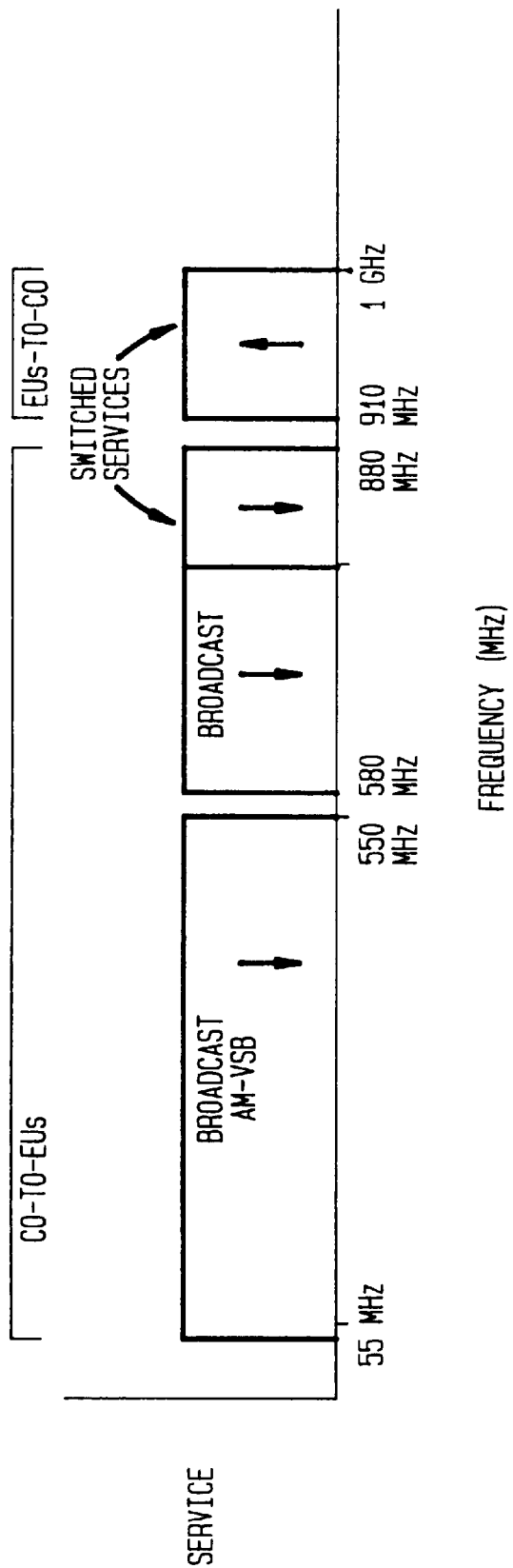
FIG. 2 is a diagram showing a bandwidth-to-service assignment in the mFN-HFC network of FIG. 1.

As shown in FIG. 2, the downstream broadcast information on coax cables 125 includes the analog signals to provide CATV service (AM–VSB). In the exemplary system, the analog CATV service occupies a frequency band from 55 MHz to 550 MHz. The coaxial cables 125 connect the FN 120 to a corresponding plurality of amplifier/mFN modules $160_1$–$160_n$. A representative configuration of one of the amplifier/mFN modules $160_1$–$160_n$ is shown in the amplifier/mFN module $160_n$. The configuration of amplifier/mFN modules $160_2$–$160_n$ would be similar, and thus are not shown in FIG. 1 for clarity.

From the amplifier/mFN module $160_1$, the coaxial cables $180_1$ distribute signals to and receives signals from a physically connected subset of EUs 184. Each of EUs 184 can include a network interface unit 190, which can be connected to a telephone unit 192, a television unit, which can include a set-top box 194, and a modem or personal computing system 196. An exemplary end-unit is shown in FIG. 1 as EU $184_1$.

As shown in FIG. 1, amplifier/mFN module $160_1$ connects mFN $166_1$, and uni-directional amplifier $162_1$, through a diplexer $164_1$ to a subset of approximately fifty of the EUs 184, of which only EU $184_1$ and EU $184_2$ are shown. That is, each amplifier/mFN module $160_1$–$160_n$ is associated with a subset of EUs 184. The mFN $166_1$ includes an optical receiver $168_1$, a laser transmitter $167_1$, and a diplexer $169_1$. An optical fiber $102_1$ connects transmitter $148_1$ in COIU $150_1$ to mFN $166_1$. Similarly, optical fiber $103_1$ connects receiver $151_1$ in COIU $150_1$ to the mFN $166_1$. Alternatively, a single fiber solution could be implemented with optical transceivers or optical couplers between the COIU $150_1$–$150_n$ and the amplifier/mFN modules $160_1$–$160_n$. Also optical splitters and combiners, possibly using wavelength-division multiplexing (WDM), could be used to connect multiple mFNs $166_1$–$166_n$ to the CO 110 (e.g., one pair of transmitters $148_1$–$148_n$ and receivers $151_1$–$151_n$) to reduce the fiber required.

The diplexer $164_1$ combines signals transmitted from the FN 120 (via the amplifier $162_1$) and the mFN $166_1$ onto coaxial cable $180_1$. Diplexer $164_1$ also directs upstream signals from the subset of EUs 184 connected to amplifier/mFN module $160_1$ to the CO 110. Diplexer $164_1$–$164_n$ crossover can be dynamically arranged such that the bandwidth of services delivered to the EUs 184 using COIUs $150_1$–$150_n$ and services delivered using the transmitter 142 can be dynamically allocated. The bandwidth allocation to the transmitter 142 can be limited within the capabilities of the amplifiers $162_1$–$162_n$.

As shown in FIG. 2, the CO 110 transmits analog broadcast signals downstream in the frequency band from 55 MHz to 550 MHz over the optical fiber 101 and through the receiver 122, the splitter 124, the coaxial cables 125, amplifiers $162_1$–$162_n$, diplexers $164_1$–$164_n$ and coaxial cables $180_1$–$180_n$ to the EUs 184. Eventually these analog signals may be replaced with digital signals on analog subcarriers. For example, as HDTV (high-definition TV) becomes deployed, cable operators may replace some AM–VSB channels with HDTV channels.

Amplifier/mFN modules $160_1$–$160_n$ place the mFNs $166_1$–$166_n$ adjacent to each distribution amplifier $162_1$–$162_n$ along coaxial cables 125. Diplexer $164_1$ connects both amplifier $162_1$ and the mFN $166_1$ to a subset of the EUs 184 via coaxial cable $180_1$. Therefore, additional services can be incorporated into the mFN-HFC network 100 without affecting the downstream broadcast CATV services.

The provisioning of switched services over a mFN-HFC network is described in U.S. patent application Ser. No. 08/526,736. The CO 110 can use, for example, the COIU $151_1$ to deliver switched services to a subset of the EUs 184 in the frequency band 580 MHz to 1 GHz over the optical fibers $102_1$, $103_1$, the mFN $166_1$, the diplexer $164_1$ and the coaxial cables $180_1$. The switched services can be dynamically allocated within the bandwidth of the coaxial cable $180_1$ outside the bandwidth devoted to the broadcast service transmitted over transmitter 142 and fiber 101. As shown in FIG. 2, the frequency band of 580 MHz to 1 GHz may be used by services such as telephony, video telephony, facsimile, data services, enhanced-pay-per-view (EPPV), etc. In addition, the 5–40 MHz bandwidth can be used for upstream signals, to maintain compatibility with conventional HFC networks.

Transmitters $148_1$–$148_n$ and the receivers $151_1$–$151_n$ use modems $146_1$–$146_n$ to provide access to switched services (hereafter also referred to as allocated services) at CO 110. Service providers can connect through the modems $146_1$–$146_n$ to the CO 110. Transmitters $148_1$–$148_n$ deliver switched services in the frequency band outside the transmitter 142 bandwidth (e.g., from 580 MHz to 1 GHz) over optical fibers $102_1$–$102_n$ to the mFNs $166_1$–$166_n$. The mFNs $166_1$–$166_n$ further transmit the broadcast or switched services to EUs 184 using diplexers $164_1$–$164_n$ and the coaxial cables $180_1$–$180_n$. Thus, the upstream and downstream switched services are in the system bandwidth above the bandwidth limitation of the coaxial amplifiers $162_1$–$162_n$. By using the bandwidth above the bandwidth limitation of the amplifiers $162_1$–$162_n$ services provided to the EUs 184 using the amplifiers $162_1$–$162_n$ are not affected. Further, the total available bandwidth to the mFN-HFC network 100 is increased.

Although transmitter 142 can broadcast signals to all EUs 184 within the HFC network, broadcast signals can also be transmitted over the mFNs $166_1$–$166_n$ using transmitters $148_1$–$148_n$. Transmitters $148_1$–$148_n$ have the capability to transmit CDV signals, however the transmitters $148_1$–$148_n$ might not meet the stringent specifications required for transmitting analog AM–VSB signals.

Broadcast digital services including broadcast CDV signals can be provided using a single broadcast module 144 in the CO 110 and providing a CDV decoder module (not shown) in each of the EUs 184. The CDV decoder module can be incorporated as a separate unit from a television unit or incorporated within the television unit 194. The broadcast module 144 is connected to each of the transmitters $148_1$–$148_n$ through corresponding combiners $147_1$–$147_n$. This configuration allows broadcast digital services to be provided by the CO 110 over the optical cables $102_1$–$102_n$ to all of the EUs 184 connected to the amplifier/mFN modules $160_1$–$160_n$.

The mFNs $166_1$–$166_n$ are analog optical transceivers and carry digital information on analog subcarriers. The amplifiers $162_1$–$162_n$ in amplifier/mFN modules $160_1$–$160_n$ maintain the desired signal levels on coaxial cables 125 and $180_1$–$180_n$. Accordingly, coaxial cable components are passive along cables $180_1$–$180_n$ from amplifier/mFN modules $160_1$–$160_n$ to each of the connected EUs 184. The passive transmission medium including diplexers $164_1$–$164_n$ have a usable bandwidth of 1 GHz, in contrast to active coaxial systems, which are limited to 750 MHz by conventional bi-directional and uni-directional amplifiers. As shown in FIG. 2, the mFN-HFC network 100 in FIG. 1 advantageously uses bandwidth from 55 MHz to 1 GHz on the passive coaxial cable components. In addition, since the connection to the home is passive, this bandwidth can be flexibly allocated between upstream and downstream traffic simply by placing appropriate filters in mFNs $166_1$–$166_n$ and the home.

As discussed above, in one embodiment, mFNs $166_1$–$166_n$ transmit digital information on analog subcarriers. Because these signals do not require the high performance required by analog AM–VSB signals, lower-cost lasers and lower-power electronics can be used for transmitters $148_1$–$148_n$, the receivers $151_1$–$151_n$, receivers $168_1$–$168_n$ and transmitters $167_1$–$167_n$. Additionally, because COIUs $150_1$–$150_n$ do not carry AM–VSB signals, which have stringent SNR and linearity requirements, the high performance laser 142 is not necessary. Further, the modularity of the mFN-HFC network 100 provides advantageous connectivity to any pre-existing coaxial cable system. However, when transmitting CDV with various types of services concurrently, prior-art techniques of power allocation to the transmitted signals are insufficient.

In accordance with one embodiment, up to seventy channels, for example, of broadcast digital video services can be provided through the broadcast module 144. As shown in FIG. 1, the CO 110 uses compressed digital video (CDV) to transmit digital broadcast video to EUs 184. One type of CDV technology, which could appropriately be incorporated in the mFN-HFC network 100 has been developed for direct-broadcast-satellite (DBS) transmission. Accordingly, one of ordinary skill in the art would understand how to modify DBS CDV technology to encode the video information to be transmitted as digital information on an analog subcarrier in mFN-HFC network 100. Using a video compression standard such as the MPEG video compression standard, video signals can be compressed, for example, to an average bit rate of approximately 4 Mbps. Further, error-correction coding such as Reed-Solomon and convolutional error-correction codes can be used. In one embodiment, the error-correction encoding doubles the necessary transmission bit rate, but the signal-to-noise ratio (SNR) requirement is reduced. A signal-to-noise ratio as low as 6 dB can be used to transmit CDV using DBS techniques. Accordingly, the performance capabilities of the transmitters $148_1$–$148_n$ are sufficient for transmitting broadcast digital services including broadcast digital CDV signals. Broadcast module 144 supplies the CDV signals to transmitters $148_1$–$148_n$ via combiners $147_1$–$147_n$.

Accordingly, mFN-HFC network 100 shown in FIG. 1 provides broadcast analog services, switched digital services and broadcast digital services to the plurality of EUs 184 from the CO 110. The broadcast analog services are provided using the transmitter 142 while the digital services (both switched/allocated services and broadcast services)

are provided using transmitters $148_1$–$148_n$. In summary, each of the COIUs $150_1$–$150_n$ includes transmitters $148_1$–$148_n$ for transmitting switched services and broadcast services over one of optical fibers $102_1$–$102_n$ to one of amplifier/mFN modules $160_1$–$160_n$, associated with a subset of EUs 184. In addition, each of COIUs $150_1$–$150_n$ can service a different optical fibers $102_1$–$102_n$, $103_1$–$103_n$, a different amplifier/mFN module $160_1$–$160_n$ or set of amplifier/mFN modules $160_1$–$160_n$. Also, each of COIUs $150_1$–$150_n$ can correspond to a set of optical fibers $102_1$–$102_n$, $103_1$–$103_n$.

A RF spectrum of signals transmitted by the CO 110 to the EUs 184 can be allocated with respect to the predetermined or dynamically requested services by EUs 184. As the mFN-HFC network 100 is configured to provide digital broadcast services in addition to analog broadcast services, the RF spectrum can be allocated between the analog transmitter 142 and the transmitters $148_1$–$148_n$ in the COIUs $150_1$–$150_n$ to most closely resemble the requests of the EUs 184. The broadcast services requested by EUs 184 can include basic television services, radio services, premium channel services transmitted in the form of broadcast pay-per-view (PPV) or premium channels. With respect to the PPV or premium channels broadcast digital services, each end-unit selecting the service is preferably equipped with a decoder device.

The digital switched services can include telecommuting, multimedia, data transmission, audio and video telephony and Internet services.

In contrast to the broadcast services, the switched digital services including switched digital video are transmitted to the EUs 184 upon a specific one of the associated EUs 184 initiating a request or acknowledging a call. The switched services are then transmitted only to the amplifier/mFN module $160_1$–$160_n$ Upon receipt of the transmitted RF spectrum, each of EUs 184 decodes a portion of the digital switched signal carrying the selected service intended for that one of the EUs 184. That is, only one of the EUs 184 that requested or specified a switched service may be able to "decode" the transmitted switched service.

Figure 3:
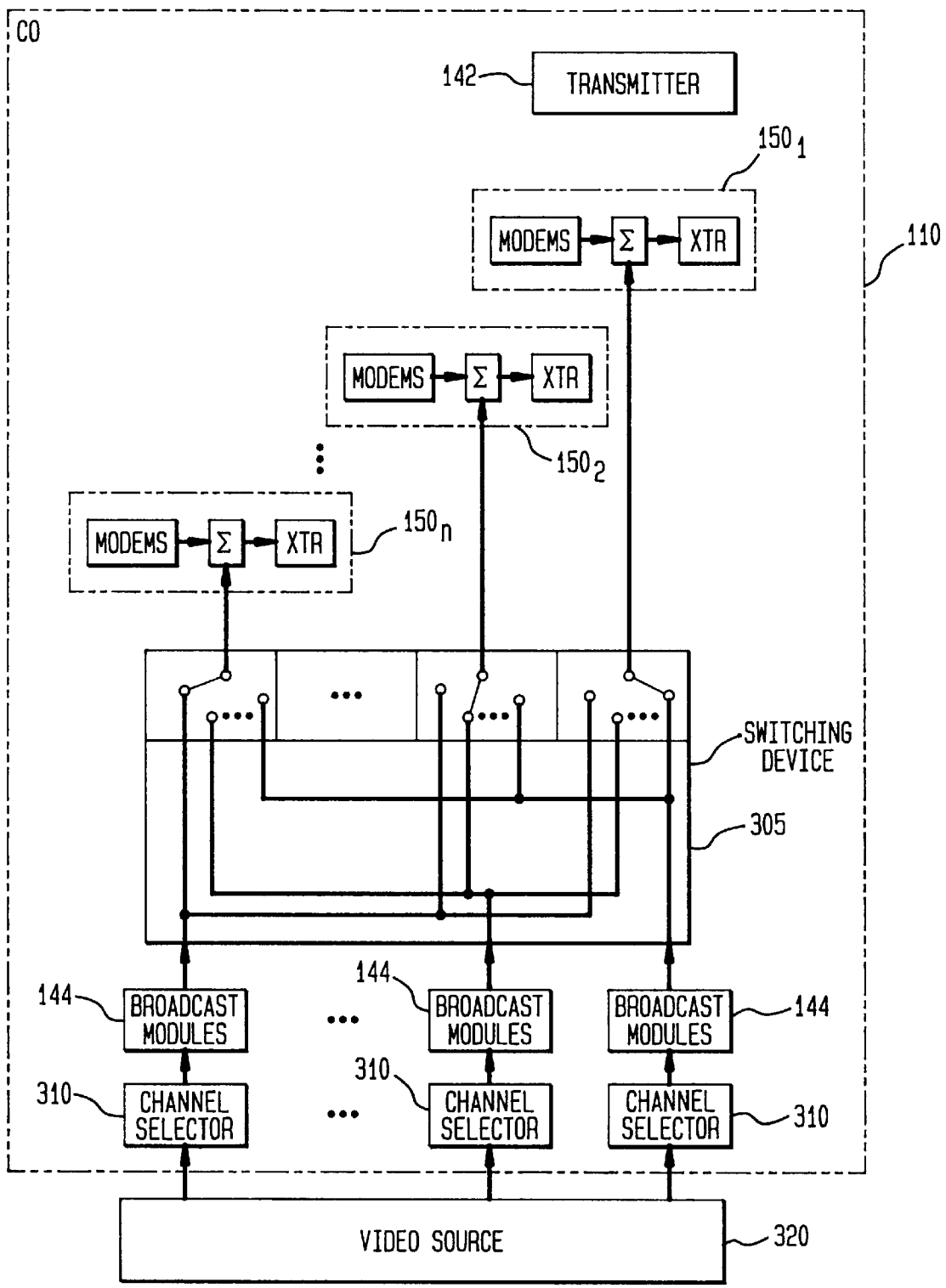
FIG. 3 is a diagram showing a portion of another configuration of a central office.

FIG. 3 shows a further embodiment in which the EUs 184 in a mFN-HFC network are dynamically allocated into broadcast groups. The granularity of the broadcast group could be as low as the number of EUs 184 physically connected to a mFN such as mFNs $166_1$–$166_n$. As each of the mFNs $166_1$–$166_n$ is deeper in mFN-HFC network 100 relative to FN 120, the granularity of the broadcast group from the COIUs $150_1$–$150_n$ is greater than the FN 120. Each of the EUs 184 in a broadcast group would receive the same digital broadcast services. One of the CDV channel selectors 310 is associated with each broadcast group. The broadcast digital channels to be transmitted are selected by the one of the CDV channel selectors 310 associated with that broadcast group. As shown in FIG. 1, a plurality of CDV channel selectors 310 are located in CO 110. However, each of the CDV channel selectors 310 can serve multiple broadcast groups or multiple COs 110. Further, the CDV channel selectors 310 can be located at the CO 110 or at a location remote from the CO 110. The CO 110 permits the mFN-HFC network operator to configure the broadcast group using demographics or geographic location parameters of the subscribing EUs 184.

Video signals are digitized and compressed using CDV encoders. CDV encoders are preferentially located at video source 320, so that separate broadcast groups using the same channel do not each need to encode that channel. Alternatively, CDV encoders can be located in the channel selectors 310. RF modems (not shown) are used to place the CDV signals on analog subcarriers, and frequency converters (not shown) are used to convert these subcarriers to the appropriate broadcast frequencies. The RF modems may be placed at the video source 320, in the channel selectors 310, or in a plurality of broadcast modules 144 shown in FIG. 3. The frequency converters may be placed in either the channel selectors 310 or the broadcast modules 144. The channel selectors 310 and video source 320 may be located at the CO 110, though they need not be. The video source 320 may be distributed over many locations.

The broadcast groups can be dynamically allocated by implementing a switching device 305 between the broadcast modules 144 and COIUs $150_1$–$150_n$ in the CO 110. Each of the COIUs $150_1$–$150_n$ is physically connected via an optical fiber $102_1$–$102_n$ to an associated amplifier/mFN module $160_1$–$160_n$ as shown in FIG. 1. Through one of the amplifier/mFN modules $160_1$–$160_n$, each of the COIUs $150_1$–$150_n$ is physically connected to a subset of the EUs 184. That is, each amplifier/mFN module $160_1$–$160_n$ is associated with its own subset of EUs 184. Dynamic allocation using the switching device 305 allows subsets of EUs 184 who share common interests to be grouped together even as the geographic boundary between neighborhoods move. If a Spanish speaking neighborhood is expanding, more COIUs may be added to the broadcast group that contain Spanish language stations at an associated CO.

The broadcast group can therefore be a selection of a subset of EUs 184 that request digital video channels that can be collected within a given set, for example, of fifty transmitted channels. A plurality of broadcast modules 144 are shown in FIG. 3. If all the illustrated COIUs $150_1$–$150_n$ were connected by the switching device 305 to one of the broadcast modules 144, the broadcast digital services provided would be similar to FIG. 1. Further, the digital video channels transmitted to the broadcast group can then dynamically change through the operation of the channel selectors 310 with the preference of the subset of EUs 184 in the broadcast group.

In other words, if a retirement community were adjacent a residential community, the financial news network and travel channels instead of children's television channels could be allocated to the respective broadcast groups by the channel selectors 310. The EUs 184 also receive analog broadcast service from the analog broadcast transmitter 142.

The simultaneous transmission of digital switch services and digital broadcast services with their associated modulation formats and error correction techniques over a single transmission medium increases the complexity of the associated transmitted RF spectrum. Optimal performance of the various signals transmitted over the large available bandwidth of the mFN access path a mFN-HFC system requires an improved allocation of channel power over the transmitted signals bandwidth. An appropriate allocation of power/Hz will allow cable operators to efficiently use the upstream and downstream channels provided by mFN-HFC networks to provide new services (i.e., telephony, Internet services, etc.). Accordingly, the allocation of power per Hertz is preferably determined based on the services provided by the mFN-HFC network. (The power per Hertz can be calculated from the optical modulation depth (OMD) of the RF channel, when the channel's bandwidth is known.) Further, as the services requested can be dynamically allocated, the power per Hertz could be modified accordingly.

Figure 4:
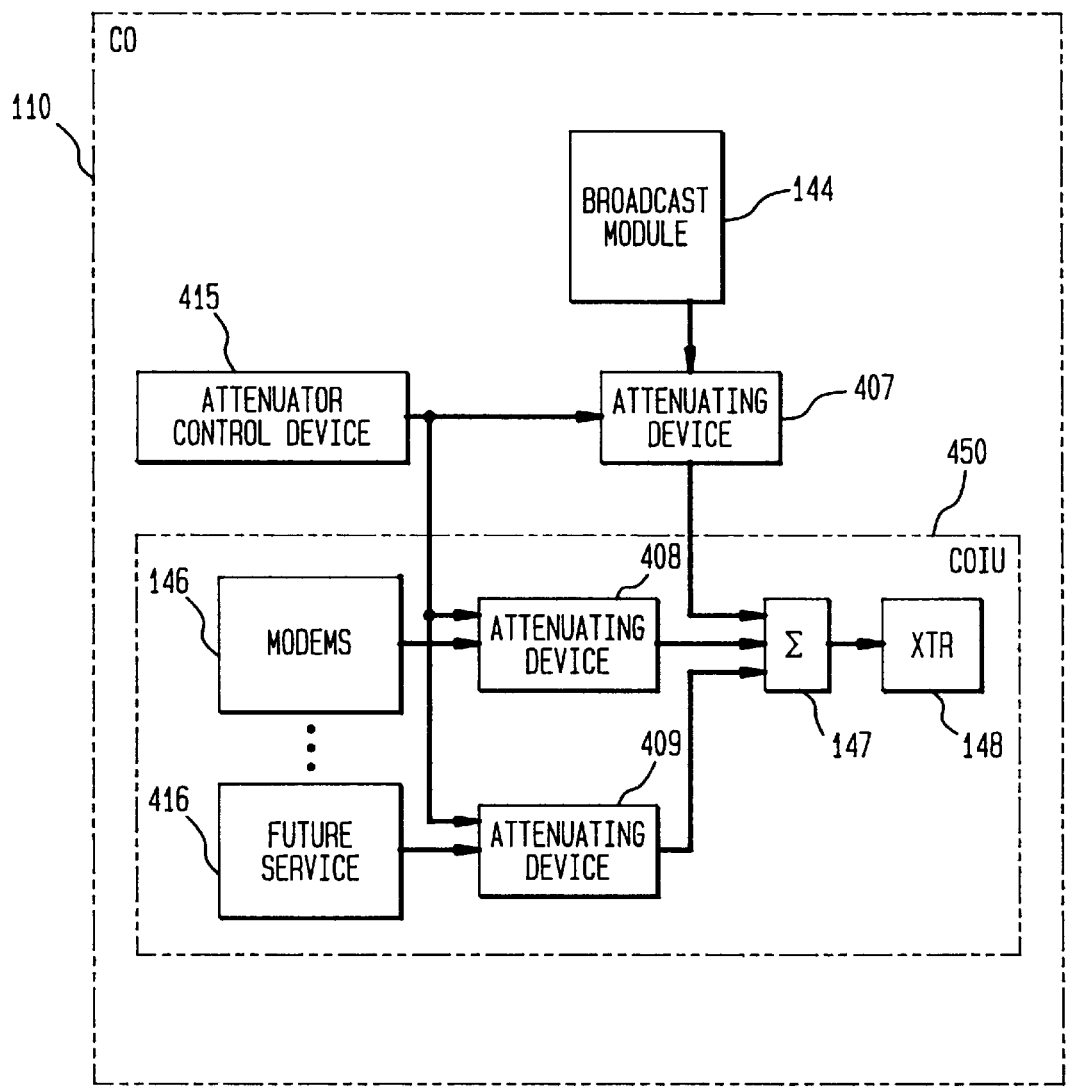
FIG. 4 is a diagram showing a portion of yet another configuration of a central office.

FIG. 4 shows an embodiment in which each type of service to be provided within an RF spectrum transmitted by a COIU 450 has an associated attenuating device 407, 408, 409. The COIU 450 is similar to COIUs $150_1$–$150_n$, accordingly, only differences between COIU 450 and COIUs $150_1$–$150_n$ will be described hereafter. The RF spectrum transmitted by COIU 450 will be received by a subset of the EUs 184. As shown in FIG. 4, the broadcast module 144 is connected to attenuator 407. Modems 146 providing a switched service are connected to attenuator 408 and a representative future service module 416 providing a representative future service is connected to attenuator 409. Each attenuator individually varies the RF power provided by the associated service provider to the RF spectrum signal transmitted by COIU 450.

The attenuators 407, 408, and 409 set the power-per-Hertz (PPH) or power-per-channel based on the required BER performance of the services provided by the COIU 450. Each attenuator can be individually controlled or controlled through an attenuator control device 415 as shown in FIG. 4. Further, the attenuators 407, 408 and 409 can optionally be incorporated into the broadcast module 144, the modems 146 and the future service module 416, respectively, or other associated equipment. In other words, the attenuator 407 can be part of the broadcast module 144.

The services provided to the EUs 184 include different modulation formats (e.g., quadrature-phase-shift keying and 64 quadrature amplitude modulation). Modulation formats for transmitting broadcast or switched digital services such as digital video services or telephony services are well known to those skilled in the art. Further, the services provided to EUs 184 may include different error correction techniques. Error correction techniques incur additional costs and signal propagation delays. For example, video telephony cannot accommodate significant delay and should therefore incorporate fewer error-correction techniques. On the other hand, broadcast video is insensitive to delays and therefore can incorporate error-correction using techniques that introduce a delay due to the signal processing.

Services delivered to the EUs 184 may have different requirements, as is well known to those skilled in the art. The requirements can be described at least in terms of delay tolerances or error tolerances. For example, transmitted music is extremely tolerant to delay but is very intolerant to errors. In contrast, transmitted voice services are tolerant of errors but intolerant of delay.

Thus, setting the PPH of the transmitted RF spectrum of the services provided to subsets of the EUs 184 according to the required BER performance improves the quality of the overall services received. The overall quality is improved because the impact of the modulation technique, the error correction technique and the received service tolerance are incorporated into the required BER performance.

Figure 5:
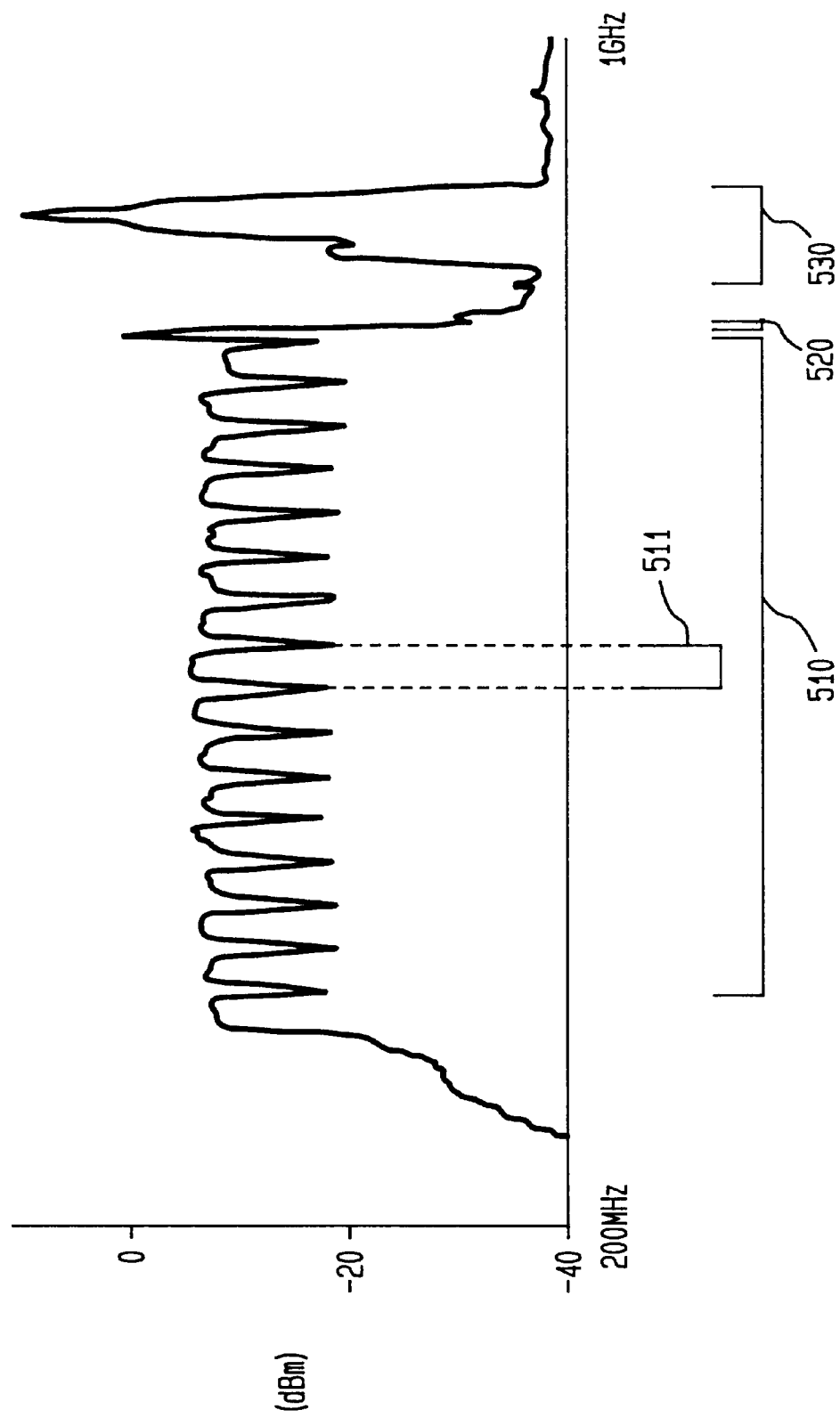
FIG. 5 is a diagram showing an RF signal that drives a laser.

FIG. 5 shows experimental data of a 300 MHz to 900 MHz signal that includes broadcast digital video services 510, telephony services 520 and data transmission services 530. The broadcast digital video services were transmitted using 16 DBS derived CDV signals 511 encoded by quadrature-phase-shift keying (QPSK), with each 40-Mbps QPSK channel carrying five video channels. The QPSK channels were separated by 30 MHz, so that each video channel required the same bandwidth as if AM–VSB were used, however, a SNR of only about 6 dB is required for good image quality.

Uncooled, unisolated, lasers have been demonstrated to be capable of transmitting 2 data channels, and over seventy channels of CDV. In the experiment CDV signals were derived from a commercial DBS system and frequency shifted to operate in the 320–800 MHz range. A 20-Mbps channel was transmitted at 880 MHz using simple on-off keying and envelope detection to demonstrate data transmission services 530. A 2-Mbps QPSK channel was transmitted to demonstrate that telephony signals could be transmitted. Currently, commercial equipment is available to transmit telephone service 520 using time-division multiplex telephony signals from many homes onto one 2-Mbps QPSK channel.

As shown in FIG. 5, the RF spectrum of the transmitted signals illustrates that the telephony services 520 were transmitted with approximately 8 dB higher power than the broadcast digital video (CDV) services 510. Further, the data transmission services 530 were transmitted approximately 16 dB higher than the CDV services. The power levels of the three types of signals were balanced so that the minimal RF drive for acceptable performance on all the signals would coincide.

Figure 6:
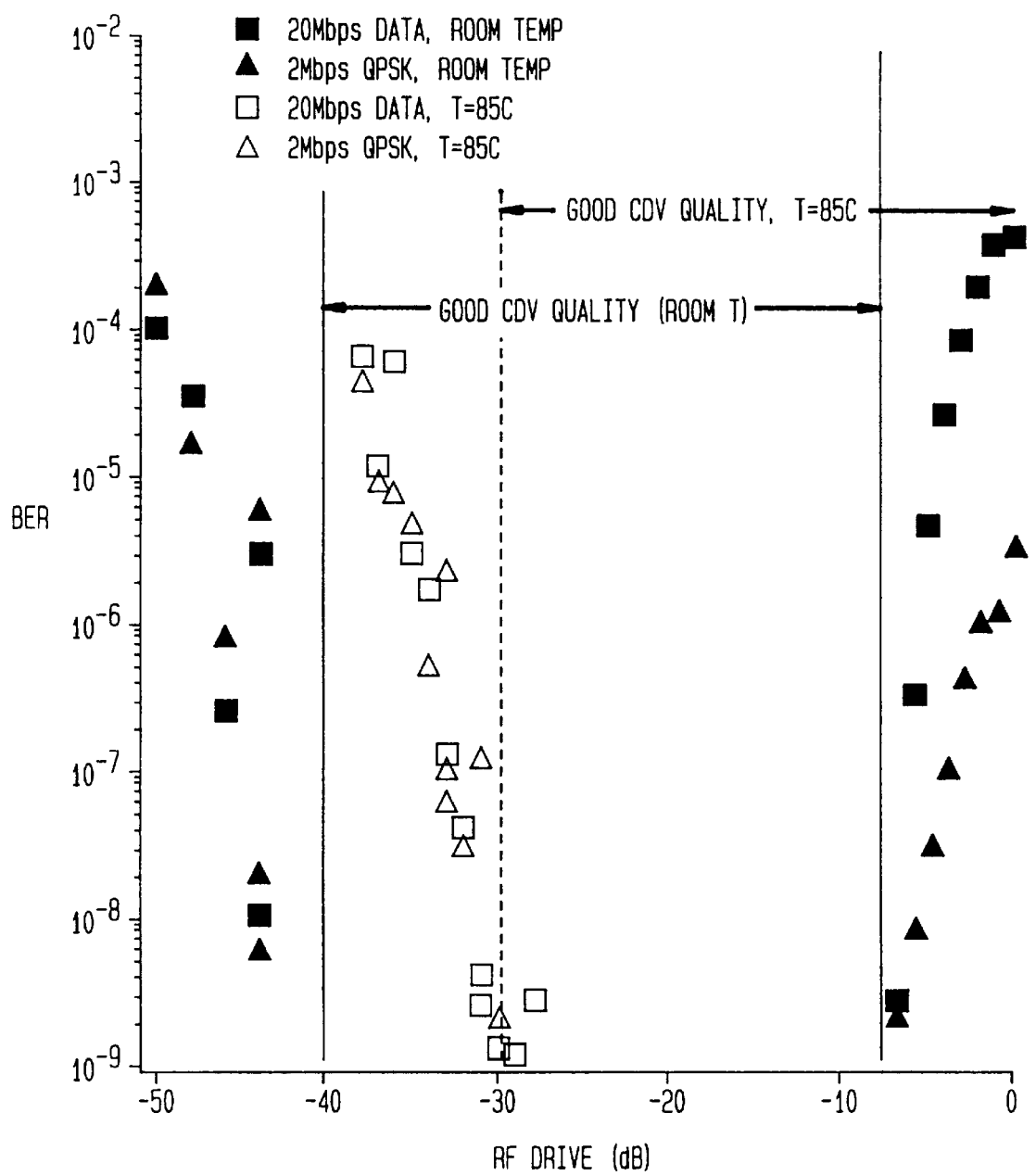
FIG. 6 is a diagram showing the BER plotted as a function of the RF drive level.

FIG. 6 shows the BER of the data channels plotted as a function of the RF drive level. The image quality was also monitored and deemed unacceptable if any errors were visible. Errors appear as either a "blockiness" in the picture or as a frozen picture. Data was taken at both room temperature (25° C.) and at 85° C. The BER was good (remained below $10^{-9}$) over a 20-dB range in the RF drive input level from approximately –8 dB to –28 dB despite a 60° C. temperature change from 25° C. to 85° C. The picture quality was also good over this range. The errors at low drive level were due to a poor SNR, with relative-intensity noise (RIN) being the dominant noise source. The errors at high drive level were due to the laser being driven below threshold, which generated impulse noise.

The onset of clipping (when the laser gets driven below threshold) is dependent on the total RF drive to the laser. If the signals had equal PPH, then errors due to clipping would occur when the power in the 20 Mbps data channel was lower. At lower drive levels the SNR of a particular channel is dependent on the PPH of that channel. Since errors due to low SNR would occur at the same minimum signal level, and the maximum signal level where errors are due to clipping would occur at a lower signal level in the 20 Mbps data channel the acceptable range of signal levels would be reduced. If constant PPH is used in all channels, then to avoid this degradation in the 20 Mbps data channel will require that fewer CDV signals be transmitted.

While the invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A communications network, comprising:

a central office;

a plurality of intermediate nodes;

a plurality of end-units, each of the plurality of end-units associated with at least one of the plurality of intermediate nodes;

at least one first transmission medium carrying a broadcast signal and an allocated signal which connects the central office to a subset of the plurality of intermediate nodes, a plurality of second transmission mediums each connecting at least one of the plurality of intermediate nodes to a subset of the plurality of end-units; and at least one third transmission medium connecting the central office to the plurality of intermediate nodes, wherein the at least one third transmission medium carries a first signal to the plurality of intermediate nodes, the at least one first transmission medium carries a second signal to at least one of the plurality of intermediate nodes and the plurality of second transmission mediums carries signals from the plurality of intermediate nodes to at least one of the plurality of end units, wherein the second signal uses a different frequency band than the first signal and the first signal and the second signal are combined at the plurality of intermediate nodes and wherein the second signal includes an allocated signal that is transmitted to at least one of the plurality of end units; and wherein the at least one first transmission medium carries a broadcast signal to at least one of the plurality of intermediate nodes.

2. The communications network of claim 1, wherein the at least one third transmission medium includes a fiber node, an optical fiber connecting the central office and the fiber node and a plurality of communication lines each connecting the fiber node with at least one of the plurality of intermediate nodes.

3. The communications network of claim 1, wherein the first signal is an analog video signal.

4. The communications network of claim 1, wherein the second signal includes at least a digital video signal.

5. The communications network of claim 1, wherein the allocated signal is an encoded signal such that only the specified end-unit can receive and decode the allocated signal.

6. The communications network of claim 1, wherein the allocated signal is a coded signal for decoding by only the specified end-unit.

7. The communications network of claim 1, wherein the central office includes a power control device for controlling the power per Hertz of the second signal transmitted along each of the plurality of first transmission mediums.

8. The communications network of claim 1, wherein the power control device controls the power per Hertz of the second signal based on a required bit-error-rate performance of the signal at the end-units.

9. The communications network of claim 1, wherein the central office includes one transmitter for transmitting the second signal from the central office along one of the plurality of first transmission mediums to an intermediate node for physical connection to a subset of the plurality of end-units.

10. The communications network of claim 1, wherein each of the plurality of first transmission mediums includes an optical fiber.

11. The communications network of claim 1, wherein the central office includes a switching device that controls the broadcast signal that is transmitted over the at least one first transmission medium.

12. The communications network of claim 1, wherein the central office includes a switching device that controls which of the at least one first transmission medium carries the second signal.

13. The communications network of claim 1, wherein the allocated signal provides a switched service.

14. A communications network comprising:
a first transmission medium connected to a central office, the central office transmitting a first broadcast service over the first transmission medium;
a plurality of second transmission mediums separate from the first transmission medium, the central office transmitting a second broadcast service over the plurality of second transmission mediums;
a plurality of intermediate nodes, each one of the plurality of intermediate nodes connected to a separate one of the plurality of second transmission mediums to receive the second broadcast service and connected to receive the first broadcast service, each of the intermediate nodes combining the first broadcast service and the second broadcast service; and
a plurality of passive transmission mediums each for connecting one of the intermediate nodes to a corresponding subset of a plurality of end-units, wherein the plurality of intermediate nodes send the combined first broadcast service and second broadcast service along the plurality of passive transmission mediums for receipt by each of the plurality of end-units.

15. The communications network of claim 14, wherein the central office includes an allocating device for transmitting an allocated signal along one of the plurality of second transmission mediums to an associated one of the plurality of intermediate nodes, the allocated signal being further sent along one of the passive transmission mediums to a specified end-unit.

16. The communications network of claim 15, wherein the allocated signal is a frequency division multiplexed signal for transmission to the specified end-unit.

17. The communications network of claim 15, wherein the central office includes a power control device for controlling power per Hertz of the second broadcast service.

18. The communications network of claim 15, wherein the central office includes a power control device for controlling power per Hertz of the allocated signal.

19. The communications network of claim 15, wherein the central office includes a channel allocation device for controlling which broadcast is transmitted as the second broadcast service.

20. A data transmission system comprising:
a central office;
a transmission medium for connecting the central office to a plurality of end-units, the central office transmitting a plurality of digital services along the transmission medium; and
a power control device for controlling digital service signals on analog subcarriers of the transmission medium based on a power per channel determined by bit-error-rate performance requirements of the digital services provided.

21. The data transmission system of claim 20, wherein the digital services include a broadcast service and at least one allocated service.

22. The data transmission system of claim 20, wherein the digital services are transmitted using at least one type of modulation format and at least one type of error correction encoding.

23. A method of transmitting signals from a central office to an end-unit of a plurality of end-units, the method comprising:
transmitting a first broadcast signal along a first transmission medium from the central office to an intermediate node;
transmitting a second broadcast signal along a second transmission medium to the intermediate node;
transmitting a third signal along the first transmission medium to the intermediate node;
combining the first and the second broadcast signals and the third signal into a combined signal at the intermediate node; and transmitting the combined signal to the end-unit.

24. The method of claim 23, wherein the third signal is an encoded signal specific to the end-unit.

25. The method of claim 23, further comprising controlling power per Hertz of the first broadcast signal and the third signal based on requirements of the combined signal provided to the end-unit.

26. The method of claim 23, wherein the first broadcast signal is a digital video signal.

27. The method of claim 23, further comprising controlling the first broadcast signal based on a broadcast preference of the end-unit.

28. The method of claim 23, wherein the first transmission medium is an optical medium and the second transmission medium includes a node, the method further comprising:

receiving the second broadcast signal via the second transmission medium at the node; and transmitting a fourth broadcast signal to the intermediate node via a third transmission medium, the fourth broadcast signal containing a same information as that of the second broadcast signal.

29. The method of claim 23, wherein the third signal is a switched signal, the first broadcast signal is a digital signal and the second broadcast signal is an analog signal.

30. The method of claim 23, wherein the third signal is a switched signal, the first broadcast signal includes a digital video signal and the second broadcast signal includes an analog video signal.

31. A method of communicating between a central office and a plurality of end-units, the method comprising:

transmitting a first broadcast service from the central office over a first transmission medium;

transmitting a second broadcast service from the central office over a plurality of second transmission mediums;

receiving and combining the first broadcast service and the second broadcast service at a plurality of intermediate nodes; and sending the combined first broadcast service and second broadcast service from the plurality of intermediate nodes along a third transmission medium for connection to a corresponding plurality of end-units.

32. The method of claim 31, further comprising transmitting an allocated signal from the central office along one of the plurality of second transmission mediums to one of the plurality of intermediate nodes for connection to a specified end-unit.

33. A method of transmitting signals from a central office to a plurality of end-units, the method comprising:

transmitting a first broadcast signal along a plurality of first transmission mediums from the central office to a plurality of intermediate nodes, each first transmission mediums corresponding to one of the intermediate nodes;

transmitting a second broadcast signal along a plurality of second transmission mediums to the intermediate nodes;

transmitting third signals along the first transmission mediums to the intermediate nodes, each of the third signals being associated with one end-unit of the end-units and transmitted to one of the intermediate nodes connected to the one end-unit;

combining the first and the second broadcast signals and the third signals into combined signals at respective ones of the intermediate nodes; and transmitting each of the combined signals to one of the end-units.

* * * * *